United States Patent
Ichikawa (10) Patent No.: US 9,005,817 B2
(45) Date of Patent: Apr. 14, 2015

(54) ELECTRODE FOR LITHIUM BATTERY COMPRISING SOLID ELECTROLYTE NANOPARTICLES AND LITHIUM BATTERY

(75) Inventor: Sukenori Ichikawa, Suwa (JP)

(73) Assignee: Seiko Epson Corporation (JP)

( * ) Notice: Subject to any disclaimer, the term of this patent is extended or adjusted under 35 U.S.C. 154(b) by 353 days.

(21) Appl. No.: 12/852,858

(22) Filed: Aug. 9, 2010

(65) Prior Publication Data

US 2011/0045355 A1 Feb. 24, 2011

(30) Foreign Application Priority Data

Aug. 18, 2009 (JP) ................. 2009-189168
Aug. 2, 2010 (JP) ................. 2010-173910

(51) Int. Cl.
| | |
|---|---|
| *H01M 4/58* | (2010.01) |
| *H01M 4/64* | (2006.01) |
| *H01M 10/056* | (2010.01) |
| *H01M 4/13* | (2010.01) |
| *H01M 4/04* | (2006.01) |
| *H01M 4/62* | (2006.01) |
| *H01M 10/052* | (2010.01) |
| *H01M 10/0562* | (2010.01) |
| *H01M 4/131* | (2010.01) |

(52) U.S. Cl.
CPC ............. *H01M 4/13* (2013.01); *H01M 4/043* (2013.01); *H01M 4/62* (2013.01); *H01M 4/622* (2013.01); *H01M 10/052* (2013.01); *H01M 10/0562* (2013.01); *H01M 4/131* (2013.01); *Y02E 60/122* (2013.01)

(58) Field of Classification Search
USPC ............ 429/322, 309, 316, 221, 231.95, 234, 429/324; 423/306, 311; 252/182.1
See application file for complete search history.

(56) References Cited

U.S. PATENT DOCUMENTS

| | | | |
|---|---|---|---|
| 5,494,762 A * | 2/1996 | Isoyama et al. ............... | 429/221 |
| 6,506,523 B1 * | 1/2003 | Hatazawa et al. ............. | 429/316 |
| 2002/0192137 A1 * | 12/2002 | Chaloner-Gill et al. ....... | 423/306 |
| 2004/0096745 A1 | 5/2004 | Shibano et al. | |
| 2004/0101752 A1 * | 5/2004 | Oosawa et al. ............... | 429/217 |
| 2004/0131934 A1 * | 7/2004 | Sugnaux et al. .............. | 429/209 |
| 2006/0216596 A1 * | 9/2006 | Cheiky .......................... | 429/217 |

(Continued)

FOREIGN PATENT DOCUMENTS

| | | |
|---|---|---|
| CN | 101099250 A | 1/2008 |
| JP | 08-195219 | 7/1996 |

(Continued)

OTHER PUBLICATIONS

"Investigation on lithium-polymer electrolyte batteries", Appetecci et al., Journal of Power Sources 97-98 (2001) 790-794, Dec. 28, 2000.*

(Continued)

*Primary Examiner* — Kenneth Douyette
(74) *Attorney, Agent, or Firm* — Harness, Dickey & Pierce, P.L.C.

(57) ABSTRACT

A lithium battery electrode body includes: a collector electrode; and an electrode mixture layer in which a plurality of first particles including electrode active material and a plurality of second particles including solid electrolyte are mixed, wherein the electrode mixture layer is provided on one of sides of the collector electrode, and an average particle size of the plurality of second particles is smaller than an average particle size of the plurality of first particles.

12 Claims, 3 Drawing Sheets

(56) References Cited

U.S. PATENT DOCUMENTS

| | | | |
|---|---|---|---|
| 2007/0048619 A1 | 3/2007 | Inda | |
| 2007/0087249 A1* | 4/2007 | Lee et al. | 429/33 |
| 2007/0111074 A1* | 5/2007 | Park et al. | 429/33 |
| 2007/0292759 A1 | 12/2007 | Ugaji et al. | |
| 2008/0020283 A1* | 1/2008 | Miyashiro et al. | 429/322 |
| 2008/0160415 A1* | 7/2008 | Wakita et al. | 429/231.5 |
| 2009/0035648 A1* | 2/2009 | Kimura | 429/120 |
| 2009/0081554 A1* | 3/2009 | Takada et al. | 429/322 |
| 2009/0087751 A1* | 4/2009 | Kondo et al. | 429/309 |
| 2012/0028128 A1 | 2/2012 | Seino et al. | |

FOREIGN PATENT DOCUMENTS

| | | | |
|---|---|---|---|
| JP | 2001-015162 A | | 1/2001 |
| JP | 2002293629 A | * | 10/2002 |
| JP | 2003-173769 A | | 6/2003 |
| JP | 2004-179158 | | 6/2004 |
| JP | 2006-185913 A | | 7/2006 |
| JP | 2006-277997 | | 10/2006 |
| JP | 2007-095376 A | | 4/2007 |
| JP | 2007-273313 A | | 10/2007 |
| JP | 2008059843 A | * | 3/2008 |
| JP | 2008-226463 A | | 9/2008 |
| JP | 2009238704 A | * | 10/2009 |
| JP | 2010-245038 A | | 10/2010 |
| WO | WO-2009-038037 A1 | | 3/2009 |

OTHER PUBLICATIONS

"Fabrication of all solid-state lithium-ion batteries with three-dimensionally ordered composite electrode consisting of Li0.35La0.55TiO3 and LiMn2O4", Hara et al., Journal of Power Sources, 189 (2009) 485-489. Dec. 24, 2008.*

* cited by examiner

ELECTRODE FOR LITHIUM BATTERY COMPRISING SOLID ELECTROLYTE NANOPARTICLES AND LITHIUM BATTERY

The entire disclosure of Japanese Patent Application Nos. 2009-189168, filed Aug. 18, 2009 and No. 2010-173910, filed Aug. 2, 2010 are expressly incorporated by reference herein.

BACKGROUND

1. Technical Field

The present invention generally relates to electrodes for lithium batteries and lithium batteries.

2. Related Art

Lithium batteries using lithium or lithium containing material as negative electrodes are not only light in weight and large in capacity, but also capable of providing high voltages when combined with appropriate positive electrodes. For this reason, lithium batteries are widely used as batteries for portable electronic equipment, cameras, watches, electric tools, hybrid automobiles and the like. However, such lithium batteries use highly active lithium and organic electrolyte, which cause for concern about their dangers, such as, firing and explosion at the time of short-circuits. Therefore, it is an important issue in designing lithium batteries to secure their safety.

As a method for securing the safety, the use of non-aqueous electrolyte may be enumerated. As an attempt to implement the non-aqueous electrolyte, lithium polymer batteries that use gel polymer electrolyte have been developed. However, in this attempted method, organic electrolyte is impregnated in gel polymer, such that the problems concerning the limitation of battery cycle life and danger of explosion have not been solved.

Also, as another attempt to implement the non-aqueous electrolyte, lithium batteries that use ceramic electrolyte (inorganic solid electrolyte) have been developed (see, for example, Japanese Laid-open Patent Application 2006-277997 (Patent Document 1)). By using the ceramic electrolyte, only lithium ions are ions that move in the electrolyte by the battery reaction and therefore almost no side reaction occurs. Further, as the ceramic electrolyte does not include flammable organic solvent, and thus does not need a sealing member or a liquid sealing structure, whereby reduction in size and thickness of the battery can be achieved.

However, according to the method for powder molding ceramic electrolyte powder with electrode active material powder, as described in Patent Document 1 as one of the embodiments, insufficient contacts occur between the ceramic electrolyte powder and the electrode active material particles, and between the ceramic electrolyte powder and the ceramic electrolyte powder, such that battery power output high enough for practical use cannot be obtained. Furthermore, the interfacial contacts become unstable because of volume changes that take place with charge-discharge cycles, whereby the battery cycle life is deteriorated.

On the other hand, another type of lithium batteries has been reported (see, for example, Japanese Laid-open Patent Application 2004-179158 (Patent Document 2)) in which a vapor phase thin film deposition method such as sputtering is used to form a laminate of layers, such as, positive electrode thin film/ceramic electrolyte thin film/negative electrode thin film. According to such a method of laminating thin films, good contact can be achieved at interfaces between the electrode (the positive electrode thin film or the negative electrode thin film) and the ceramic electrolyte, and the thickness of the active material layer and the electrolyte layer can be reduced, such that high power output and excellent battery cycle life characteristics are expected to be obtained.

However, according to the method recited in Patent Document 2, the total thickness of the active material per unit area is only about 1 μm to several μm, and therefore it is difficult to manufacture batteries with sufficient charge capacity. In other words, in order to obtain a sufficient charge capacity as batteries, it is necessary to manufacture batteries in which the total thickness of active material exceeds 100 μm. However, by the method described in Patent Document 2, it is difficult to obtain the total thickness exceeding 100 μm, such that batteries with sufficient charge capacity have not yet been manufactured.

SUMMARY

In accordance with an advantage of some aspects of the invention, it is possible to provide lithium batteries in which their safety can be secured, sufficiently large power output can be obtained, and large capacity implementation can be achieved, and it is also possible to provide electrodes for lithium batteries suitable to manufacturing the lithium batteries.

In accordance with an embodiment of the invention, a lithium battery electrode body includes a collector electrode, and an electrode mixture layer in which a plurality of first particles including electrode active material particles and a plurality of second particles including solid electrolyte particles are mixed, wherein the electrode mixture layer is provided on one of sides of the collector electrode, and an average particle size of the plurality of second particles is smaller than an average particle size of the plurality of first particles.

According to the lithium battery electrode body described above, the average particle size of the plurality of second particles is smaller than the average particle size of the plurality of first particles, contact points between the electrode active material and the solid electrolyte per unit volume increase, whereby the contact area at their interfaces becomes greater, whereby lithium batteries using such electrode bodies can provide greater output, and large capacity implementation thereof becomes possible. Furthermore, the electrode mixture layer in which the plurality of first particles including electrode active material particles and the plurality of second particles composed including solid electrolyte particles are mixed is disposed on one of the sides of the collector electrode, whereby non-aqueous electrolyte implementation can be achieved, and therefore it becomes easier to secure the safety of the battery.

In the lithium battery electrode body described above, the electrode mixture layer may preferably be formed by press forming the mixture of the plurality of first particles and the plurality of second particles. As a result, fixing of the electrode mixture layer to the collector electrode becomes easier, which makes non-aqueous electrolyte implementation easier.

In the lithium battery electrode body described above, the electrode mixture layer may preferably have the plurality of second particles covering the plurality of first particles on a side of the electrode mixture layer opposite to a side thereof in contact with the collector electrode. As a result, when a lithium battery is manufactured with the electrode bodies, short-circuit between the positive electrode and the negative electrode in the lithium battery using the electrode bodies can be securely prevented by a coating layer of solid electrolyte in which the plurality of second particles cover the plurality of first particles.

Also, in the lithium battery electrode body described above, an average particle size of the solid electrolyte particles in the plurality of second particles may preferably be 100 nm or less. As a result, when a ceramic electrode mixture layer is formed by sintering the plurality of second particles and the plurality of first particles, the sintering temperature can be lowered. As the sintering temperature is lowered in this manner, deterioration of the electrode active material particles (the first particles) and degeneration of the conductive particles (conductive agent) and the binder, that may be added if necessary, can be prevented, and accidental chemical reaction of the aforementioned material can also be prevented.

Also, in the lithium battery electrode body described above, the plurality of second particles may preferably include dielectric particles having an average particle size of 100 nm or less. As a result, the ionic conductivity of the electrode active material per unit weight is increased by the so-called interfacial electrical double layer effect, in which an electrical double layer is formed at the interface between the dielectric particles and the other particles, whereby defect density is increased.

Also, in the lithium battery electrode body described above, the other particles described above are the plurality of second particles including inorganic solid electrolyte, for example.

Also, in the lithium battery electrode body described above, the electrode mixture layer may preferably be provided with a solid electrolyte layer on a side opposite to the side thereof in contact with the collector electrode. As a result, when a lithium battery is manufactured using the electrode bodies, short-circuit between the positive electrode and the negative electrode of the lithium battery using the electrode bodies can be more securely prevented by the solid electrolyte layer.

Also, in the lithium battery electrode body described above, organic solvent or organic electrolytic solution may be impregnated in the electrode mixture layer. As a result, when a lithium battery is manufactured using the electrode body, its ionic conductivity becomes higher by the aid of the organic solvent or the organic electrolytic solution, resulting in a greater power output.

A lithium battery in accordance with an embodiment of the invention, in the lithium battery electrode body may be used as a positive electrode or a negative electrode. According to this lithium battery, contact points between the electrode active material and the solid electrolyte per unit volume increase, as described above, and the electrode body with an increased contact area at these interfaces is used, whereby higher power output and greater capacity can be achieved. Also, the use of the electrode mixture layer makes non-aqueous electrolyte implementation possible, which makes it easier to secure the safety of the battery.

A lithium battery in accordance with another embodiment of the invention includes a positive electrode that is formed from the lithium battery electrode body having the electrode active material particles being positive electrode active material particles, and a negative electrode that is disposed on the electrode mixture layer of the lithium battery electrode body and is formed from metal negative electrode active material and a collector electrode. According to this lithium battery, contact points between the electrode active material and the solid electrolyte per unit volume increase, as described above, and the electrode body with an increased contact area at these interfaces is used, whereby higher power output and greater capacity can be achieved. Also, the use of the electrode mixture layer makes non-aqueous electrolyte implementation possible, whereby securing the safety of the battery becomes easier. Furthermore, the batter is equipped with the electrode mixture layer containing solid electrolyte, there is no concern for formation of dendrite, such that, for example, a negative electrode composed of lithium metal having a large capacity can be used.

A lithium battery in accordance with still another embodiment of the invention includes a positive electrode that is formed from the lithium battery electrode body having the electrode active material particles being positive electrode active material particles, and a negative electrode that is formed from the lithium battery electrode body having the electrode active material particles being negative electrode active material particles. According to this lithium battery, contact points between the electrode active material and the solid electrolyte per unit volume increase, as described above, and the electrode body with an increased contact area at these interfaces is used, whereby higher power output and greater capacity can be achieved. Also, by the use of the electrode mixture layer, non-aqueous electrolyte implementation is made possible, which the safety of the battery can be more readily secured. Furthermore, separators that are required in lithium batteries of the related art are made unnecessary, such that the number of components is reduced, and therefore the cost can be reduced.

Also, according to any one the lithium batteries described above, organic solvent or organic electrolytic solution may be impregnated in all the electrode mixture layers disposed between the collector electrode of the positive electrode and the collector electrode of the negative electrode. As a result, the ionic conductivity is made higher by the aid of the organic solvent or the organic electrolyte, which results in a greater power output.

Also, according to any one of the lithium batteries described above, organic solvent or organic electrolytic solution may be impregnated in the electrode mixture layer and the solid electrolyte layer disposed between the collector electrode of the positive electrode and the collector electrode of the negative electrode.

DESCRIPTION OF EXEMPLARY EMBODIMENTS

Figure 1:
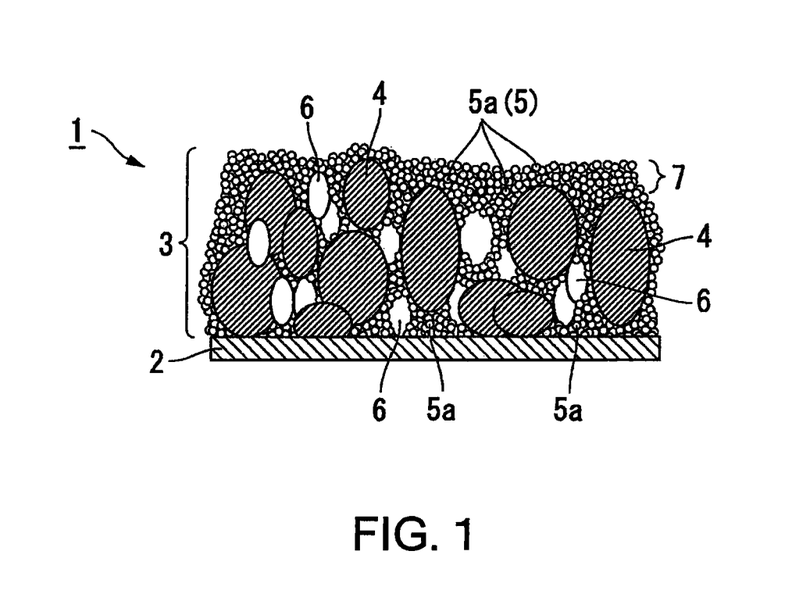
FIG. 1 is a side cross-sectional view of a main portion of a lithium battery electrode body in accordance with a first embodiment of the invention.

Embodiments of the invention are described in detail below with reference to the accompanying drawings. First, an electrode for a lithium battery (hereafter also referred to as a lithium battery electrode) in accordance with an embodiment of the invention is described. FIG. 1 is a side cross-sectional view of a main portion of the lithium battery electrode body in accordance with the embodiment of the invention. Reference numeral 1 in FIG. 1 denotes a lithium battery electrode (hereafter also abbreviated as a battery electrode).

The battery electrode 1 is equipped with a plate-like (or a foil-like) collector electrode 2, and an electrode mixture layer 3 that is in contact with one surface side of the collector electrode 2, and may be used as a positive electrode or a negative electrode of a lithium secondary battery (a lithium battery) to be described below. The collector electrode 2 is made of a conductive thin plate material (or a foil material), such as, Cu, Ni, Ti, Al, stainless steel, carbon or the like. The material is suitably selected depending on whether the electrode body 1 is used as a positive electrode or a negative electrode. Also, the collector electrode 2 is connected to a positive electrode wiring layer (not shown) or a negative electrode wiring layer (not shown)

Also, the collector electrode 2 may be connected to positive electrode wiring or negative electrode wiring or the like in place of the positive electrode wiring layer or the negative electrode wiring layer described above.

The electrode mixture layer 3 is made of a molded body formed through mixing a plurality of first particles 4 composed of inorganic electrode active material (electrode active material) and a plurality of second particles 5 composed of inorganic electrolyte particles 5a (solid electrolyte) to form a mixture, and sintering the mixture in a pressure molding. As the inorganic electrode active material that form the first particles, inorganic positive electrode active material is used when the electrode body 1 is used as a positive electrode, and inorganic negative electrode active material is used when the electrode body 1 is used as a negative electrode.

As the inorganic positive electrode active material, lithium cobaltate ($LiCoO_2$), lithium nickelate ($LiNiO_2$), lithium manganate ($LiMn_2O_4$), lithium titanate ($Li_4TiZ_5O_{12}$) and the like may be used. As the inorganic negative electrode active material, lithium titanate ($Li_4Ti_5O_{12}$) and the like may also be used.

The first particles 4 composed of inorganic electrode active material may have an average particle size (diameter) of about 1 μm-10 μm. In it noted that, in the present invention, the average particle size is defined as follows. When the electrode mixture layer 3 is cut in an arbitrary plane (which should be a plane where the first particles 4 and the second particles 5 are present in a mixed state), the average particle size is an average value of maximum diameters (maximum lengths) of areas of all of the first particles 4 exposed in the cut surface.

As the plurality of second particles 5 composed of the inorganic solid electrolyte particles 5a, the following materials can be used.

(1) Inorganic crystals, inorganic glass or partially crystallized glass having lithium ionic conductivity;
(2) NASICON ceramic crystals, such as, $LiTi_2(PO_4)_3$, $Li_{1.3}M_{0.3}Ti_{1.7}(PO_4)_3$ [where M=Al, Sc];
(3) Perovskite ceramic crystals, such as, $Li_{0.35}La_{0.55}TiO_3$, $LiSr_2TiTaO_6$, $Li_{3x}La_{1/3-x}TaO_3$;
(4) Thio-LISICON crystals, such as, $Li_{4-x}Si_{1-x}P_xS_4$, $Li_{4-x}Ge_{1-x}P_xS_4$ and the like;
(5) Silicon crystals, such as, $Li_{14}Zn(GeO_4)_4$ or the like;
(6) Li doped $β-Al_2O_3$ crystals;
(7) Partially crystallized glass including any of the aforementioned crystals;
(8) Sulfide glass, such as, $Li_2S—SiS_2—LiPO_3$ system, $Li_2S—P_2S_5$ system glass, or the like;
(9) Oxide glass, such as, $Li_2O—SiO_2—B_2O_3$ system, $Li_2O—SiO_2—ZrO_2$ system glass, or the like; or (10) LiPON glass (see, for example, Japanese Laid-open Patent Application 2004-179158).

Also, as the plurality of second particles 5, the following materials can be preferably used.

(11) LiI crystals;
(12) $Li_3PO_4$ crystals; or
(13) Garnet-type crystals, such as $Li_7La_3Zr_2O_{12}$.

The plurality of second particles 5 composed of such inorganic solid electrolyte particles 5a may have an average particle size of about 100 nm or less, which is a common diameter of nanoparticles, and preferably about 50 nm. In other words, in accordance with the invention, as the plurality of second particles 5, it is preferred to use particles having an average particle size substantially smaller than the average particle size of the plurality of first particles 4, which is about one hundredth (1/100) or less of the average particle size of the plurality of first particles 4. As a result, contact points between the inorganic electrode active material (the first particles 4) and the inorganic solid electrolyte (the inorganic solid electrolyte particles 5a) per unit volume increase in the electrode mixture layer 3, whereby the contact area at their interfaces becomes greater.

Also, as the average particle size of the plurality of second particles 5 composed of the inorganic solid electrolyte particles 5a is set to be about 100 nm or less, the sintering temperature at the time of molding the electrode mixture layer 3, as described below, can be lowered. It is noted that, the average particle size is also defined as follows. When the electrode mixture layer 3 is cut in an arbitrary plane (which should be a plane where the first particles 4 and the second particles 5 are present in a mixed state), the average particle size is an average value of maximum diameters (maximum lengths) of areas of all of the second particles 5 (the inorganic solid electrolyte particles 5a) exposed in the cut surface, like the average particle size of the first particles 4 described above.

Also, the inorganic solid electrolyte particles 5a (the second particles 5) described above may be formed by any one of the following known methods, such as, a mechanical milling method, a hydrothermal synthesis method, a supercritical hydrothermal synthesis method, a micro-emulsifying method, RESS (Rapid Expansion of Supercritical Solution) method, PGSS (Particles from Gas Saturated Solutions) method, GAS (Gas Anti-Solvent Re-crystallization) method, SEDS (Solution-Enhanced Dispersion of Solids) method and the like. Above all, the hydrothermal synthesis method is preferred.

Also, in accordance with the present embodiment, an additive 6 composed of binder particles or conductive particles (conducting agent) is added in the electrode mixture layer 3. As the binder particles, particles composed of, for example, styrene system thermoplastic elastomer, polyolefin, polyamide, polyimide or the like. As the conducting particles, for example, carbon particles can be used. The mixing ratio between the first particles 4 and the second particles 5 (the inorganic solid electrolyte particles 5a) in the electrode mixture layer 3 is not particularly limited, but may be about 2:8-8:2 in weight ratio. Also, the mixing ratio (mixing proportion) of the total of binder particles and conducting particles in the electrode mixture layer 3 may be about 2-30% in weight ratio.

For the preparation of the electrode mixture layer 3, the first particles 4 and the second particles 5 (the inorganic solid electrolyte particles 5a) are mixed in a suitable mixing ratio, and then binder particles and conducting particles in a suitable mixing ratio are added and mixed together. The mixture is filled in a shaping mold, and heated and pressed in a manner similar to an ordinary pellet molding, whereby the electrode mixture layer 3 in a desired configuration (for example, a rectangular parallelepiped configuration) is obtained. The molding pressure and the molding temperature are appropriately set according to the kinds and the mixing ratio of the particles to be used, the kind and the amount of binder and the like. It is noted that, as the average particle size of the inorganic solid electrolyte particles 5a is about 100 nm or less, the sintering temperature at the time of molding the electrode mixture layer 3 can be lowered, whereby deterioration of the inorganic solid active material particles 5a, the conducting particles (conducting agent) and the binder can be prevented, and accidental chemical reaction of the aforementioned materials can also be prevented.

Also, with the electrode mixture layer 3 formed in this manner, the plurality of second particles 5 cover the plurality of first particles 1 on the opposite side of the side thereof that contacts the collector electrode 2. In other words, on the opposite side of the collector electrode 2, a coating layer 7 composed of the second particles 5 (inorganic solid electrolyte particles 5a) is formed. The coating layer 7 may preferably be 50 nm or more in thickness, more preferably 200 nm or more in thickness. By forming such a coating layer 7, when a lithium battery is manufactured using the electrode body 1 as described below, short-circuit between the positive electrode and the negative electrode can be securely prevented by the coating layer 7.

Then, the electrode mixture layer 3 obtained in this manner is brought in contact and affixed (bonded) with the collector electrode 2 with the coating layer 7 facing outward, whereby the electrode body 1 shown in FIG. 1 is obtained. In the electrode body 1, the average particle size of the plurality of second particles 5 is smaller than the average particle size of the plurality of first particles 4, contact points between the inorganic electrode active material and the inorganic solid electrolyte per unit volume increase in the electrode mixture layer 3, whereby the contact area at their interfaces becomes greater. Accordingly, lithium batteries using such electrode bodies 1 can provide greater power output, and large capacity implementation thereof becomes possible. Furthermore, the electrode mixture layer 3 in which the plurality of first particles 4 composed of inorganic electrode active material and the plurality of second particles 5 having inorganic solid electrolyte particles are mixed is disposed on one of the sides of the collector electrode 2, whereby non-aqueous electrolyte implementation can be achieved in lithium batteries using the electrodes, and therefore the safety of the batteries can be more readily secured.

Figure 2:
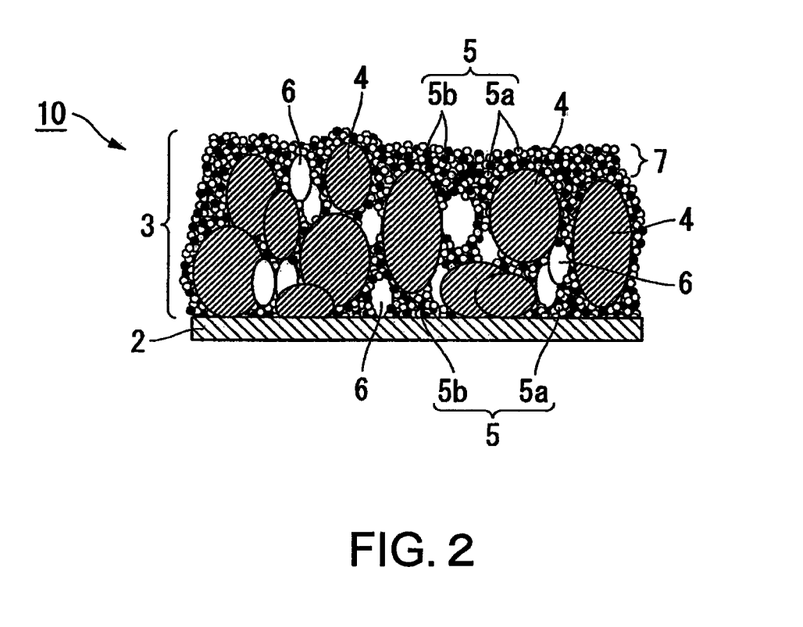
FIG. 2 is a side cross-sectional view of a main portion of a lithium battery electrode body in accordance with a second embodiment of the invention.

FIG. 2 is a side cross-sectional view of a main portion of a lithium battery electrode body in accordance with a second embodiment of the invention. Reference numeral 10 in FIG. 2 denotes a lithium battery electrode body (hereafter referred to an electrode body). The electrode body 10 is different from the electrode body 1 shown in FIG. 1 in that the plurality of second particles 5 include dielectric particles 5b, in addition to the inorganic solid electrolyte particles 5a.

The dielectric particles 5b are composed of dielectric material such as, $Al_2O_3$, $TiO_2$ or the like, and has an average particle size of about 100 nm or less, like that of the inorganic solid electrolyte particles 5a described above, and more preferably about 50 nm. The dielectric particles 5b may be included by about 1-50 mol %, and more preferably about 8 mol % in the entire second particles 5, in other words, the second particles 5 composed of the inorganic solid electrolyte particles 5a and the dielectric particles 5b.

In this manner, the electrode body 10 in accordance with the present embodiment has the dielectric particles 5b added in the second particles 5, the ionic conductivity of the inorganic electrode active material per unit weight is increased by the interfacial electrical double layer effect, whereby lithium batteries using the electrode bodies 10 can provide greater power output. It is noted that, when the mixing ratio of the dielectric particles 5b in the second particles 5 is less than 1 mol %, almost no interfacial electrical double layer effect can be obtained, such that the ionic conductivity cannot be improved. On the other hand, when the mixing ratio exceeds 50 mol %, the ionic conductivity of the entire electrode mixture layer 3 including the second particles is lowered, which is not desirable.

Figure 3:
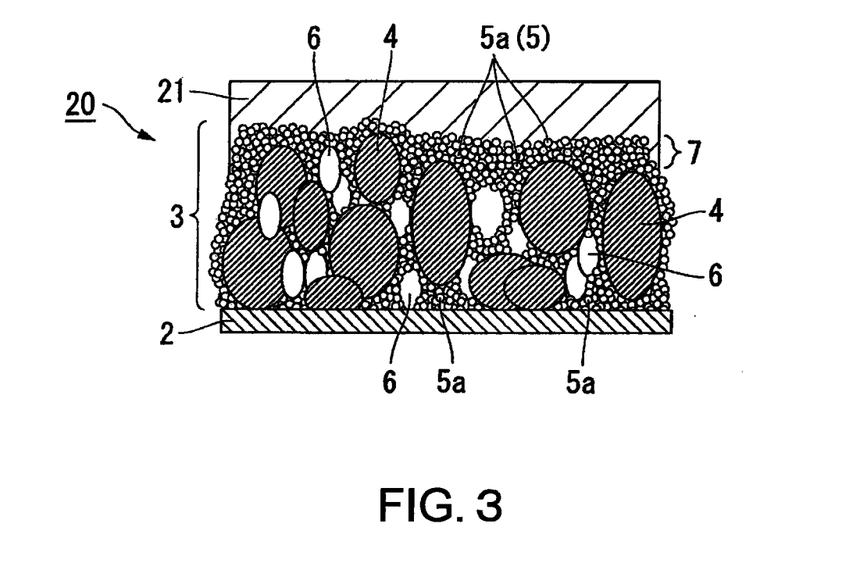
FIG. 3 is a side cross-sectional view of a main portion of a lithium battery electrode body in accordance with a third embodiment of the invention.

FIG. 3 is a side cross-sectional view of a main portion of a lithium battery electrode body in accordance with a third embodiment of the invention. Reference numeral 20 in FIG. 3 denotes a lithium battery electrode body (hereafter referred to an electrode body). The electrode body 20 is different from the electrode body 1 shown in FIG. 1 in that an inorganic solid electrolyte layer 21 is provided on the coating layer 7 of the electrode mixture layer 3, in other words, on the side opposite to the side of the electrode mixture layer 3 that is in contact with the collector electrode 2.

The inorganic solid electrolyte layer 21 may be made of substantially the same material as any one of the materials for the inorganic solid electrolyte particles 5a shown in (1)-(10) and (11)-(13) above. Inorganic solid electrolyte particles 5a pre-formed into a sheet shape (or a foil shape), or a commercially available inorganic solid electrolyte sheet may be used. Also, the inorganic solid electrolyte layer 21 that is thin enough without deteriorating the ionic conductivity may be used. For example, the inorganic solid electrolyte layer 21 that is formed in a sheet shape (a foil shape) of 2 mm or less in thickness, or more preferably 20 µm or less in thickness may preferably be used. The inorganic solid electrolyte layer 21 is placed in a shaping mold together with a mixture of the first particles 4 and the second particles 5, for example, when the electrode mixture layer 3 is shaped into a formed body by a hot-press method. Then, by hot-pressing the inorganic solid electrolyte layer 21 together with the mixture, the inorganic solid electrolyte layer 21 is formed in one piece with and on one side of the electrode mixture layer 3 (on the coating layer 7), as shown in FIG. 3.

Because the electrode body 20 is provided with the inorganic solid electrolyte layer 21, when a lithium battery is manufactured with the electrode body 20, short-circuit between the positive electrode and the negative electrode can be more securely prevented.

It is noted that, in accordance with the third embodiment, the electrode mixture layer 3 uses the same structure as that of the electrode mixture layer 3 shown in FIG. 1. However, as the inorganic solid electrolyte layer 21 is provided, the electrode mixture layer 3 without the coating layer 7 formed therein may be used. Also, as the electrode mixture layer, the one with the plurality of second particles 5 containing the dielectric particles 5b, as shown in FIG. 2, may also be used.

Furthermore, organic solvent or organic electrolyte solution may be impregnated in the electrode mixture layer 3. As the organic solvent, ethylene glycol or the like may be used. As the organic electrolyte solution, a saturated solution in which lithium chloric acid is dissolved in ethylene glycol is preferably used. In order to impregnate organic solvent or organic electrolyte solution in the electrode mixture layer 3, the electrode mixture layer 3 may have been hot pressed into a porous state. As a result, micro gaps (pores) are formed between the first particles 4 and the second particles 5, and the organic solvent or the organic electrolyte solution is impregnated and stored in the pores. When a lithium battery is manufactured with such an electrode body, the ionic conductivity in the electrode mixture layer 3 can be made higher by the aid of the organic solvent or the organic electrolyte solution, whereby the lithium battery obtained can provide higher power output.

As the organic solvent, ethylene carbonate may be used. As the organic electrolyte solution, a saturated solution in which lithium hexafluorophosphate or lithium chloric acid is dissolved in ethylene carbonate or ethylene glycol can be preferably used. Also, a press-method may be applied in place of the hot-press method described above.

Figure 4:
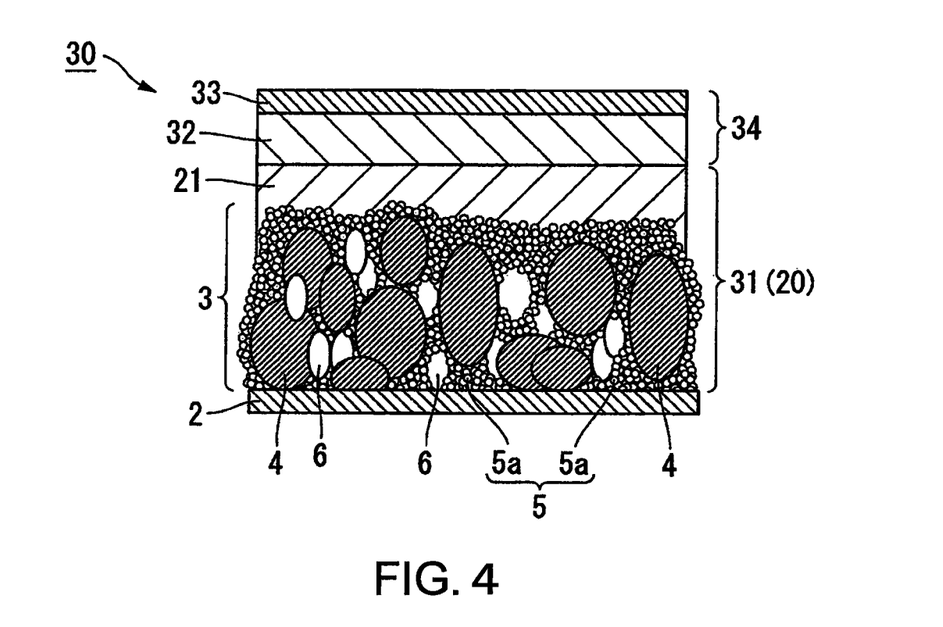
FIG. 4 is a side cross-sectional view of a main portion of a lithium battery in accordance with a first embodiment of the invention.

Next, a lithium battery in accordance with an embodiment of the invention is described. The lithium battery in accordance with the present embodiment uses the lithium battery electrode 1 (or 10 or 20) describe above as a positive electrode or a negative electrode. FIG. 4 is a side cross-sectional view of a main portion of the lithium battery in accordance with a first embodiment of the invention, and reference numeral 30 in FIG. 4 denotes the lithium battery.

The lithium battery 30 uses the electrode body 20, that is shown and described above in FIG. 3 as the electrode body (the lithium battery electrode body), on the side of a positive electrode 31. The electrode body 20 includes a collector electrode 2 and an inorganic solid electrolyte layer 21 on the opposite side of the collector electrode 2. Also, a metal negative electrode active material 32 and a collector electrode 33 are laminated in this order on the inorganic solid electrolyte layer 21 as a negative electrode 34. In the electrode body 20 used as the positive electrode 31, positive electrode active material is used as the inorganic electrode active material forming the first particles 4. As the metal negative electrode active material 32, lithium metal, Li-In alloy, Li-Al alloy or the like is used. Also, the collector electrode 33 may use the same kind of material as that of the collector electrode 2 of the electrode body 1 (or 10 or 20).

Then, the electrode body 20, the metal negative electrode active material 32 and the collector electrode 33 are laminated and placed in a shaping mold, and the entire laminate is press formed into one piece, whereby the lithium battery 30 is obtained. It is noted that a positive electrode wiring layer (not shown) is connected to the collector electrode 2 on the side of the positive electrode 31, and a negative electrode wiring layer (not shown) is connected to the collector electrode 33 of the negative electrode 34.

Also, alternatively, in place of the positive electrode wiring layer or the negative electrode wiring layer described above, positive wiring can be connected to the collector electrode 2 on the side of the positive electrode 31 and negative wiring can be connected to the collector electrode 33 on the side of the negative electrode 34.

According to this lithium battery 30, contact points between the inorganic electrode active material and the inorganic solid electrolyte per unit volume increase, as described above, and the electrode body 20 with an increased contact area at these interfaces is used, whereby higher power output and greater capacity can be achieved. Also, the use of the electrode mixture layer 3 makes non-aqueous electrolyte implementation possible, which makes it easier to secure the safety of the battery. Furthermore, because the inorganic solid electrolyte layer 21 is disposed between the electrode mixture layer 3 on the side of the positive electrode 31 and the negative electrode 34, short-circuit between the positive electrode 31 and the negative electrode 34 can be more securely prevented.

Figure 5:
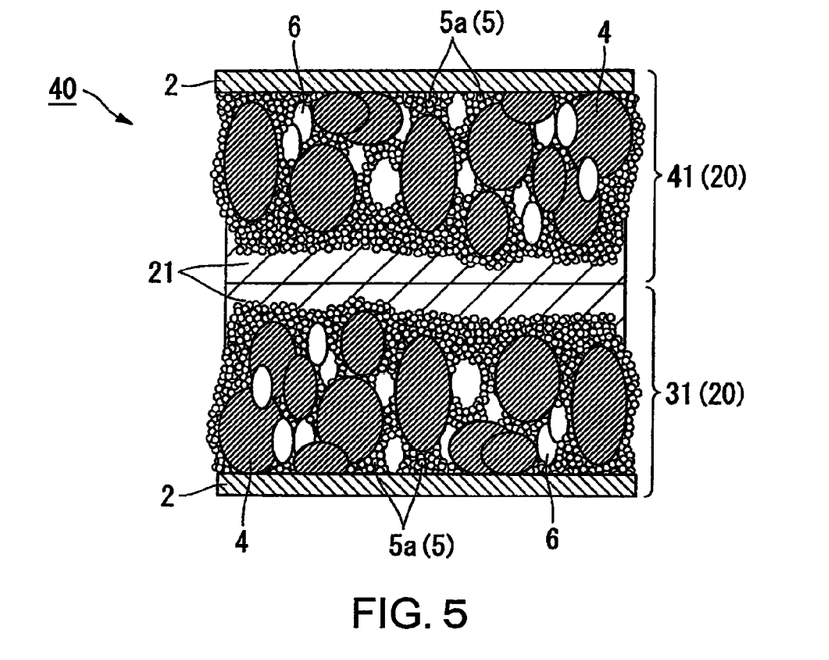
FIG. 5 is a side cross-sectional view of a main portion of a lithium battery in accordance with a second embodiment of the invention.

FIG. 5 is a side cross-sectional view of a main portion of a lithium battery in accordance with a second embodiment of the invention, and reference numeral 40 in FIG. 5 denotes the lithium battery. The lithium battery 40 is different from the one shown in FIG. 4 in that the electrode body 20 shown in FIG. 3 is used not only on the side of the positive electrode 31 but also on the side of the negative electrode. More specifically, the lithium battery 40 is formed through joining the inorganic solid electrolyte layer 21 in the electrode body 20 on the side of the positive electrode 31 with the inorganic solid electrolyte layer 21 in the electrode body 20 on the side of the negative electrode 41. The electrode body 20 used on the side of the positive electrode 31 uses positive electrode active material as the inorganic electrode active material that forms the first particles 4, and the electrode body 20 used on the side of the negative electrode 41 uses negative electrode active material as the inorganic electrode active material that forms the first particles 4.

Accordingly, in the lithium battery 40, contact points between the inorganic electrode active material and the inorganic solid electrolyte per unit volume increase, and the electrode bodies 20 with an increased contact area at these interfaces are used, whereby higher power output and greater capacity can be achieved. Also, the use of the electrode mixture layer 3 enables non-aqueous electrolyte implementation, whereby the safety can be more readily secured. Furthermore, because the inorganic solid electrolyte layer 21 is disposed between the electrode mixture layer 3 on the side of the positive electrode 31 and the electrode mixture layer 3 on the side of the negative electrode 41, short-circuit between the positive electrode 31 and the negative electrode 41 can be more securely prevented. Furthermore, separators that are required in lithium batteries of the related art are made unnecessary, such that the number of components is reduced, and therefore the cost can be reduced.

In the lithium battery 40, the electrode bodies 20 shown in FIG. 3 are used on both of the positive electrode side and the negative electrode side. However, the electrode body 20 shown in FIG. 3 may be used on one of the sides, and the electrode body 1 shown in FIG. 1 or the electrode body 10 shown in FIG. 2 may be used on the other side. Also, in the lithium batteries 30 and 40 shown in FIGS. 4 and 5, the electrode body 20 equipped with the electrode mixture layer 3 having the coating layer 7 is used. However, an electrode body equipped with the electrode mixture layer without the coating layer 7 may also be used, as the inorganic solid electrolyte layer 21 is disposed between the positive electrode side and the negative electrode side.

Figure 6:
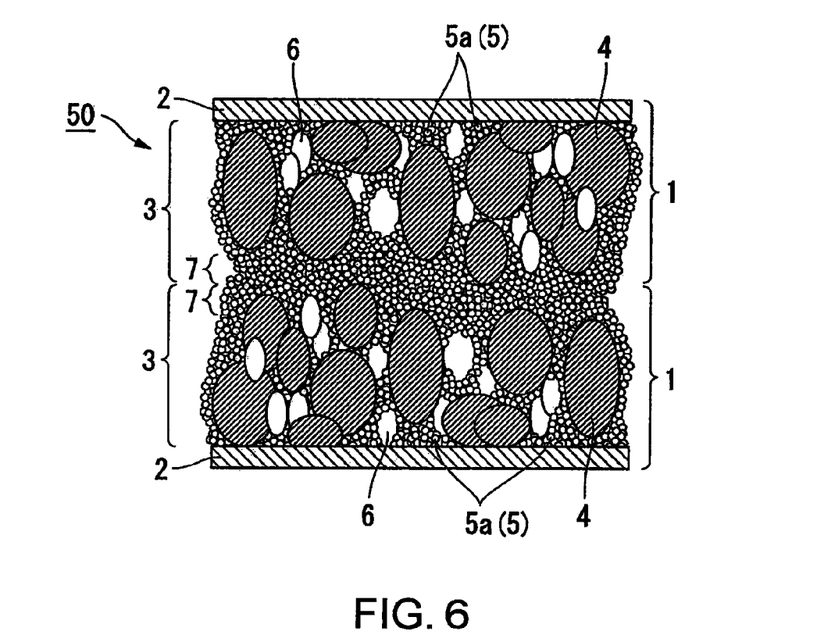
FIG. 6 is a side cross-sectional view of a main portion of a lithium battery in accordance with a third embodiment of the invention.

Furthermore, like a lithium battery 50 in accordance with a third embodiment shown in FIG. 6, electrode bodies 1 shown in FIG. 1 may be used as both the positive electrode and the negative electrode, or electrode bodies 10 shown in FIG. 2 may be used as both the positive electrode and the negative electrode. In the lithium battery 50 having such a structure, the electrode body 1 (10) equipped with the electrode mixture layer 3 having the coating layer 7 is used, such that short-circuit between the positive electrode and the negative electrode can be securely prevented.

Also, in the lithium battery 30 (40 and 50) shown in FIGS. 4-6, respectively, organic solvent or organic electrolyte solution may be impregnated in all the electrode mixture layers between the collector electrode of the positive electrode and the collector electrode of the negative electrode. In this case, the lithium battery may be assembled, using the electrode body in which organic solvent or organic electrolyte solution has been impregnated in advance in the electrode mixture layers. Alternatively, organic solvent or organic electrolyte solution may be impregnated in the electrode mixture layers of the lithium battery 30 (40 or 50) which has been assembled in the state shown in FIGS. 4-6.

Also, in the lithium battery 30 (40 and 50) shown in FIGS. 4-6, respectively, organic solvent or organic electrolyte solution may be impregnated in the electrode mixture layer and the inorganic solid electrolyte layer disposed between the collector electrode of the positive electrode and the collector electrode of the negative electrode. In this case, the lithium battery may be assembled, using the electrode body in which organic solvent or organic electrolyte solution has been impregnated in advance in the electrode mixture layers. Alternatively, organic solvent or organic electrolyte solution may be impregnated in the electrode mixture layers of the lithium battery 30 (40 or 50) and the inorganic solid electrolyte layer which have been assembled in the state shown in FIGS. 4-6

As a result, the ionic conductivity in the electrode mixture layer can be made higher by the aid of the organic solvent or the organic electrolyte solution, such that the lithium battery can provide greater power output. It is expected that the lithium battery in accordance with any one of the embodiments of the invention can provide 200 Wh or higher as a single cell that particularly emphasizes its safety, and 100 Wh or higher as an assembled battery.

Also, the ionic conductivity in the inorganic solid electrolyte layer can be made higher, such that the lithium battery can provide greater power output.

Also, the lithium batteries in accordance with any one of the embodiments of the invention can be used in portable electronic equipment such as mobile phones and notebook computers, electric vehicles and the like. Furthermore, the lithium batteries in accordance with any one of the embodiments of the invention can be used in a implantable device to be implanted in a body of a patient, which particularly emphasizes the safety, such as, a neurological stimulation device, a cardiac defibrillator, a cardiac pacemaker, a cardiac contractility module, a cardiac contractility modulator, a cardioverter, a drug delivery device, a cochlear implant, a hearing aid, a sensor, a telemetry device, and a diagnostic recorder.

The lithium battery electrode bodies and lithium batteries in accordance with the invention are not limited to those described in the embodiments, and many changes can be made within the range that does not depart from the subject matter of the invention. For example, in each of the embodiments described above, the electrode mixture layer is disposed on one of the sides of the collector electrode. However, the electrode mixture layers may be provided on both sides of the collector electrode, and the solid electrolyte may be disposed in a manner to surround the electrode mixture layer in accordance with another embodiment. Such an embodiment is also within the applicable range of the invention.

What is claimed is:

1. An electrode body of lithium battery comprising:
    a collector electrode; and
    an electrode mixture layer that includes a mixture of a plurality of first particles a plurality of second particles, and a plurality of third particles, each of the plurality of first particles containing an electrode active material, each of the plurality of second particles containing a solid electrolyte, and each of the third particles containing a binder,
    wherein the electrode mixture layer is disposed on one side of the collector electrode, and an average particle size of the plurality of second particles is smaller than an average particle size of the plurality of first particles;
    an average particle size of the plurality of second particles being 100 nm or less; and
    the second particles include $LiSr_2TiTaO_6$.

2. An electrode body of lithium battery according to claim 1, the electrode mixture layer is formed by a press forming method.

3. An electrode body of lithium battery according to claim 1, the plurality of second particles covering the plurality of first particles on one side of the electrode mixture layer, another side of the electrode mixture layer that is opposite to the one side contacting with the collector electrode.

4. An electrode body of lithium battery according to claim 1, the plurality of second particles including a plurality of dielectric particles having an average particle size of 100 nm or less.

5. An electrode body of lithium battery according to claim 1, a solid electrolyte layer being disposed on one side of the electrode mixture layer, another side of the electrode mixture that is opposite to the one side contacting with the collector electrode.

6. An electrode body of lithium battery according to claim 1, organic solvent or organic electrolytic solution being impregnated in the electrode mixture layer.

7. A lithium battery comprising the electrode body of lithium battery according to claim 1, the electrode body used as a positive electrode or a negative electrode.

8. A lithium battery comprising:
    a positive electrode including the electrode body of lithium battery according to claim 1, the electrode active material including a positive electrode active material; and
    a negative electrode that is disposed on the electrode mixture layer of the electrode body of lithium battery, the negative electrode including metal negative electrode active material and a collector electrode.

9. A lithium battery comprising:
    a positive electrode including the electrode body of lithium battery according to claim 1, the electrode active material including a positive electrode active material; and
    a negative electrode including the electrode body of lithium battery according to claim 1, the electrode active material including a negative electrode active material.

10. A lithium battery according to claim 7, organic solvent or organic electrolytic solution being impregnated in the electrode mixture layer, the electrode mixture layer being disposed between the collector electrode of the positive electrode and the collector electrode of the negative electrode.

11. A lithium battery according to claim 7, organic solvent or organic electrolytic solution being impregnated in the electrode mixture layer and a solid electrolyte layer, the electrode mixture layer being disposed between the collector electrode of the positive electrode and the collector electrode of the negative electrode.

12. An electrode body for a lithium battery, comprising:
    a collector electrode; and
    a porous electrode mixture layer that includes a plurality of first particles, a plurality of second particles, and one of an organic solvent and organic electrolyte solution,
    wherein each of the plurality of first particles contain an electrode-active material;
    each of the plurality of second particles contain a solid electrolyte;
    each of the plurality of first particles and second particles are separated by a plurality of pores, the pores being impregnated with the one of the organic solvent and the organic electrolyte solution; and
    the second particles include $LiSr_2TiTaO_6$.

* * * * *